(12) United States Patent
Kurtz et al.

(10) Patent No.: US 12,706,087 B2
(45) Date of Patent: Aug. 11, 2026

(54) METHODS AND SYSTEMS FOR VOICE CONTROL

(71) Applicant: Comcast Cable Communications, LLC, Philadelphia, PA (US)

(72) Inventors: Scott Kurtz, Philadelphia, PA (US); Philip Stick, Philadelphia, PA (US); Gary Skrabutenas, Philadelphia, PA (US); Christian Buchter, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 225 days.

(21) Appl. No.: 18/296,181

(22) Filed: Apr. 5, 2023

(65) Prior Publication Data

US 2024/0339110 A1 Oct. 10, 2024

(51) Int. Cl.
*G10L 15/05* (2013.01)
*G10L 15/08* (2006.01)
*G10L 15/22* (2006.01)
*G10L 15/30* (2013.01)

(52) U.S. Cl.
CPC .............. *G10L 15/08* (2013.01); *G10L 15/05* (2013.01); *G10L 15/22* (2013.01); *G10L 15/30* (2013.01); *G10L 2015/088* (2013.01); *G10L 2015/223* (2013.01)

(58) Field of Classification Search
CPC ............... G10L 15/22; G10L 2015/223; G10L 2015/088; G10L 15/16; G10L 15/08; G10L 15/05; G10L 15/30; G10L 15/183; G10L 15/18; G06F 40/30; G06F 40/284; G06F 40/295
USPC ........................................................ 704/251
See application file for complete search history.

(56) References Cited

U.S. PATENT DOCUMENTS 10,176,802 B1 * 1/2019 Ladhak ................... G10L 15/16
10,453,117 B1 * 10/2019 Reavely ................. G06N 5/027
11,398,226 B1 * 7/2022 Wang .................. G10L 15/1822
11,557,292 B1 * 1/2023 Wang ...................... G10L 15/16
11,688,394 B1 * 6/2023 Filimonov ........... G06N 3/0455 704/231
11,823,671 B1 * 11/2023 Ramachandra ....... G06F 40/284
11,900,937 B2 * 2/2024 Lang ....................... G06F 3/167
12,243,511 B1 * 3/2025 Joly ........................ G10L 15/26
2019/0295556 A1 * 9/2019 Wilberding ............. G10L 17/22
2021/0134276 A1 * 5/2021 Prasad .................... G10L 15/18
2022/0067289 A1 * 3/2022 Xu ........................ G06F 40/247
2022/0351724 A1 * 11/2022 Thomas .................. G10L 15/32
2023/0027828 A1 * 1/2023 Aguilar Alas .......... G10L 25/63

* cited by examiner

*Primary Examiner* — Vijay B Chawan
(74) *Attorney, Agent, or Firm* — Ballard Spahr LLP

(57) ABSTRACT

One or more portions of audio input may be detected. Timing data associated with the one or more portions of audio may be determined. Audio processing may be carried out based on the timing data.

20 Claims, 7 Drawing Sheets

| FRAME | WWCS | EVENT |
|---|---|---|
| 0 | 0 | |
| 25 | 0 | |
| 49 | 0.95 | DETECT |
| 50 | 0.99 | EOWW |
| ... | 0.99 | |
| 100 | 0.99 | SOWW |
| 101 | 0.95 | |

| FRAME | WWCS | EVENT |
|---|---|---|
| 0 | 0 | |
| 25 | 0 | |
| 49 | 0.95 | DETECT |
| 50 | 0.99 | EOWW |
| 51 | 0.99 | |
| 52 | 0.99 | |
| 53 | 0.99 | SOWW |
| 54 | 0.95 | |

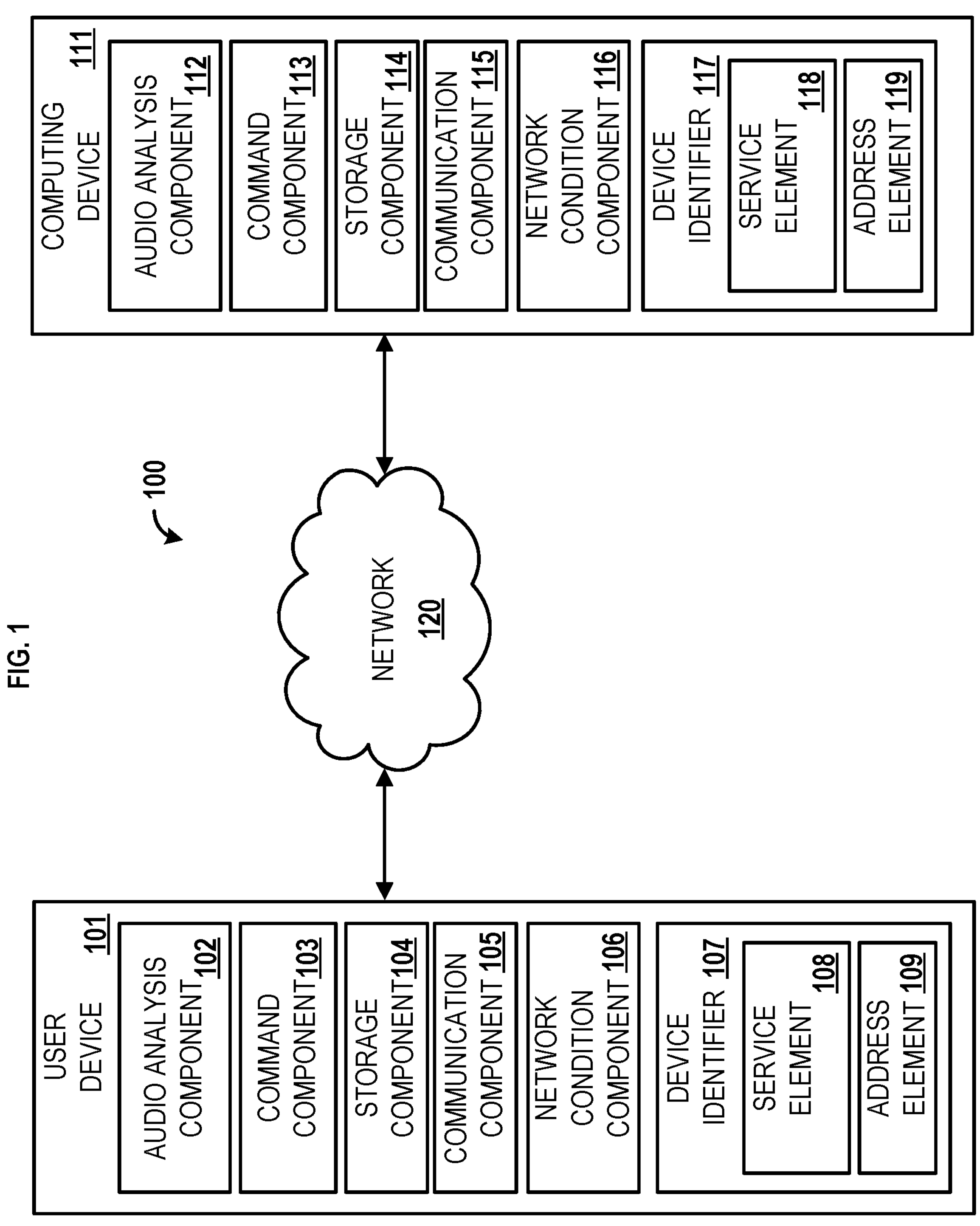
FIG. 1
100
USER DEVICE 101
AUDIO ANALYSIS COMPONENT 102
COMMAND COMPONENT 103
STORAGE COMPONENT 104
COMMUNICATION COMPONENT 105
NETWORK CONDITION COMPONENT 106
DEVICE IDENTIFIER 107
SERVICE ELEMENT 108
ADDRESS ELEMENT 109
NETWORK 120
COMPUTING DEVICE 111
AUDIO ANALYSIS COMPONENT 112
COMMAND COMPONENT 113
STORAGE COMPONENT 114
COMMUNICATION COMPONENT 115
NETWORK CONDITION COMPONENT 116
DEVICE IDENTIFIER 117
SERVICE ELEMENT 118
ADDRESS ELEMENT 119

200

1 SECOND
210
DETECTOR WINDOW
220
SHORT WAKE-WORD UTTERANCE
START OF WAKE WORD UTTERANCE
230
LONG WAKE-WORD UTTERANCE
END OF WAKE WORD

| FRAME | WWCS | EVENT |
|---|---|---|
| 0 | 0 | |
| 25 | 0 | |
| 49 | 0.95 | DETECT |
| 50 | 0.99 | EOWW |
| ... | 0.99 | |
| 100 | 0.99 | SOWW |
| 101 | 0.95 | |

| FRAME | WWCS | EVENT |
|---|---|---|
| 0 | 0 | |
| 25 | 0 | |
| 49 | 0.95 | DETECT |
| 50 | 0.99 | EOWW |
| 51 | 0.99 | |
| 52 | 0.99 | |
| 53 | 0.99 | SOWW |
| 54 | 0.95 | |

METHODS AND SYSTEMS FOR VOICE CONTROL

BACKGROUND

Speech recognition systems facilitate human interaction with computing devices, such as voice-enabled smart devices, by relying on speech. Such systems employ techniques to identify words spoken by a human user based on a received audio input (e.g., detected speech input, an utterance) and, combined with speech recognition and natural language processing techniques determine one or more operational commands associated with the audio input. Words configured to initiate audio processing are commonly known as wake words. Much of the audio processing does not take place locally and thus the device that determines the wake word and receives the command must send audio data to another device for processing. However, present systems may send too much leading or trailing audio for processing, thus unnecessarily consuming network resources and increasing the likelihood for errors in processing, all of which degrade user experience.

SUMMARY

It is to be understood that both the following general description and the following detailed description are exemplary and explanatory only and are not restrictive. Methods and systems for voice control are described. Voice-controlled devices rely on "wake words" in order to determine that a user intends to interact with the voice-controlled device. The voice-controlled device is configured to detect audio and activate certain functions if the wake word is detected. Accordingly, as the voice-controlled device receives audio, the audio is analyzed to determine if a wake word is present. The present methods and systems may determine a beginning or end of the wake word. Audio processing can be started or stopped based on detecting the beginning or end of the wake word. Accurately detecting the beginning and end of the wake word increases the efficiency of the system by not wasting resources on processing extra noise.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 shows an example system;

DETAILED DESCRIPTION

Figure 2:
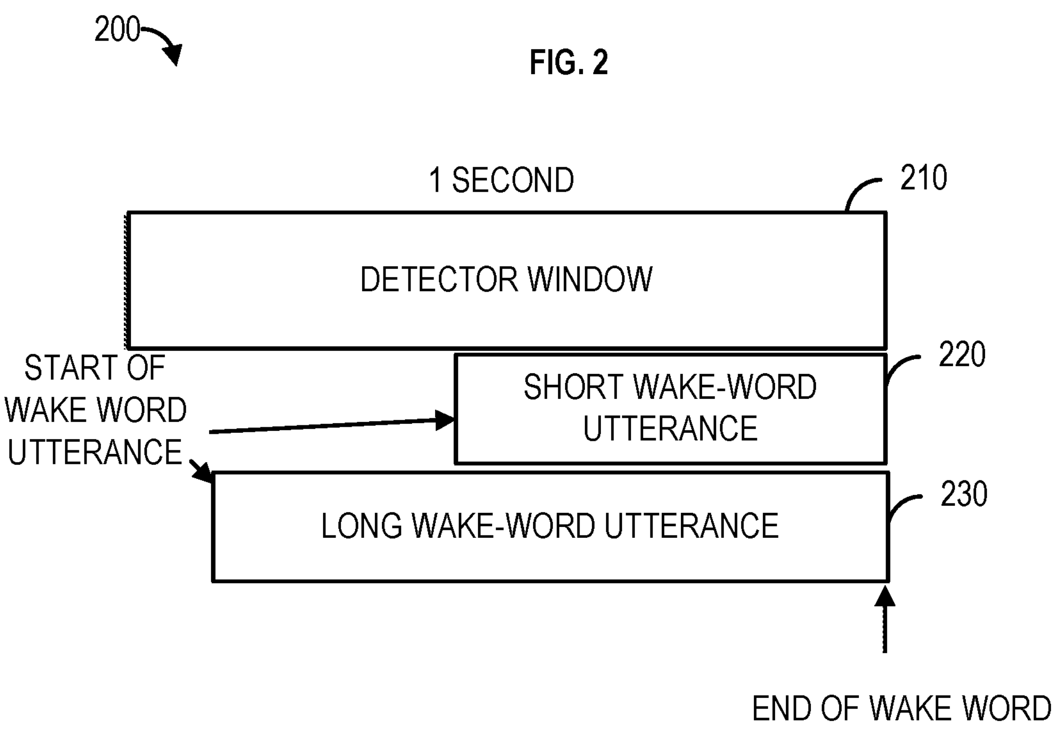
FIG. 2 shows an example diagram.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special-purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content." "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

FIG. 1 shows an example system 100. The system 100 may comprise a user device 101 (e.g., a voice assistant device, a voice-enabled device, a smart device, a computing device, etc.), a computing device 111 (e.g., a computer, a server, a content source, etc.), and a network 120. The network 120 may be a network such as the Internet, a wide area network, a local area network, a cellular network, a satellite network, and the like. Various forms of communications may occur via the network 120. The network 120 may comprise wired and wireless telecommunication channels, and wired and wireless communication techniques.

The user device 101 may comprise an audio analysis component 102, a command component 103, a storage component 104, a communication component 105, a network condition component 106, a device identifier 107, a service element 108, and an address element 109. The communications component 105 may be configured to communicate with (e.g., send and receive data to and from) other devices such as the computing device 111 via the network 120.

The audio analysis component 102 may be configured to receive audio data. For example, the user device 101 may comprise a voice-enabled device. The user device 101 may comprise, for example, one or more microphones configured to detect audio. For example, a user may interact with the user device by pressing a button, speaking a wake word, or otherwise taking some action which activates the voice-enabled device. The audio data may comprise or otherwise be associated with one or more utterances, one or more phonemes, one or more words, one or more phrases, one or more sentences, combinations thereof, and the like spoken by a user. The user device 101 may send the audio data to the computing device 111. The computing device 111 may receive the audio data (e.g., via the communications component 105). The computing device 111 may process the audio data. Processing the audio data may comprise analog to digital conversion, digital signal processing, natural language processing, natural language understanding, sending or receiving one or more queries, executing one or more commands, filtering, noise reduction, combinations thereof, and the like. The audio analysis component 102 may be configured for automatic speech recognition ("ASR"). The audio analysis component 102 may apply one or more voice recognition algorithms to the received audio (e.g., speech, etc.) to determine one or more phonemes, phonetic sounds, words, portions thereof, combinations thereof, and the like.

The audio analysis component 102 may determine audio originating from a user speaking in proximity to the user device 101. The one or more audio inputs may be speech that originates from and/or may be caused by a user, a device (e.g., a television, a radio, a computing device, etc.), and/or the like.

The audio analysis component 102 may be configured to determine, based on the detected audio, one or more wake words and/or portions thereof. The audio analysis component 102 may be configured to determine one or more of the beginning or end of a wake word. For example, the user device 101 may continuously monitor the surrounding environment for detection of the wake word. For example, the audio analysis component 102 may analyze portions of audio over a rolling period of time (e.g., an audio analysis window). The audio analysis window may have a length (e.g., a length of time) and/or may be determined based on one or more audio frames wherein each audio frame of the one or more audio frames is of a predefined duration. The audio analysis window may be longer than a wake word duration as spoken by the vast majority of the users. The wake word duration may be configured upon device registration or set up. For example, "Hey Siri" or "Alexa" or "Hello Sky" may have a duration of 0.5 seconds. Therefore, the audio analysis window may have a length greater than 0.5 seconds.

During audio analysis, the audio analysis module 102 may determine wake word confidence score configured to indicate whether the audio analysis window contains the wake word. The audio analysis component 102 may determine that the wake word has been detected based on the wake word confidence score (e.g., between 0.00 and 1.00) satisfying a wake word confidence score threshold. The beginning and/or end of a wake word may be determined based on changes in the wake word confidence score. For example, an audio frame associated with a decrease in confidence from a maximum confidence level (e.g., dropping from 0.99 to 0.95) may be associated with the beginning of the wake word. Similarly, changes in the wake word confidence score can be used to determine a start of the wake word. For example, an audio frame associated with a maximum wake word confidence score (e.g., an increase from 0.95 to 0.99) may indicate an end of the wake word.

Portions of leading audio may be removed and/or a timeframe associated with the audio analysis window may be adjusted (e.g., a beginning time stamp may be updated, ending timestamp may be updated) until the wake word confidence score drops. This point in time or this audio frame may be associated with the beginning of the wake word. For example, because a portion of removed audio contained a portion of the wake word, the wake word confidence score decreased and therefore the beginning of the wake word can be determined. A similar analysis can be performed to determine the end of wake word if the end of the wake word does not line up with the end of the analysis window.

The audio analysis component 102 may convert the determined one or more phonemes, phonetic sounds, words, portions thereof, combinations thereof, and the like to text and compare the text to one or more stored phonemes, phonetic sounds, and/or words (e.g., stored in the storage component 104, etc.), such as one or more wake words/phrases, one or more operational commands, and/or the like. The one or more wake words, one or more operational command phonemes, phonetic sounds, and/or words, may be stored (e.g., stored in the storage component 104, etc.), such as during a device (e.g., the user device 101, etc.) registration process, when a user profile associated with the user device 101 is generated, and/or any other suitable/related method. The audio analysis component 102 may determine the one or more wake words and/or the one or more operational commands from the received audio by performing speech-to-text operations that translate audio content (e.g., speech, etc.) to text, other characters, or commands.

The audio analysis component 102 may comprise an automatic speech recognition ("ASR") systems configured to convert speech into text. As used herein, the term "speech recognition" refers not only to the process of converting a speech (audio) signal to a sequence of words or a representation thereof (text), but also to using Natural Language Understanding (NLU) processes to understand and make sense of a user utterance. The ASR system may employ an ASR engine to recognize speech. The ASR engine may perform a search among the possible utterances that may be spoken by using models, such as an acoustic model and a language model. In performing the search, the ASR engine may limit its search to some subset of all the possible utterances that may be spoken to reduce the amount of time and computational resources needed to perform the speech recognition. ASR may be implemented on the user device 101, on the computing device 111, or any other suitable device. For example, the ASR engine may be hosted on the user device 101 or the computing device 111 that is accessible via the network 120. Various client devices may transmit audio data over the network to the server, which may recognize any speech therein and transmit corresponding text back to the client devices. This arrangement may enable ASR functionality to be provided on otherwise unsuitable devices despite their limitations. For example, after a user utterance is converted to text by the ASR, the server computer may employ a natural language understanding (NLU) process to interpret and understand the user utterance. After the NLU process interprets the user utterance, the server computer may employ application logic to respond to the user utterance. Depending on the translation of the user utterance, the application logic may request information from an external data source. In addition, the application logic may request an external logic process. Each of these processes contributes to the total latency perceived by a user between the end of a user utterance and the beginning of a response.

The command component 103 may receive the one or more wake words or one or more utterances and/or the one or more portions of the one or more utterances. The command component 103 may be configured for NLP and/or NLU and may determine, for example, one or more keywords or key phrases contained in the one or more utterances. Based on the one or more keywords, the command component 103 may determine one or more operational commands. The user device 101 may detect one or more wake words determine one or more operational commands. The one or more operational commands may comprise one or more channels, one or more operations (e.g., "tune to," "record," "play," etc.), one or more content titles, combinations thereof, and the like. The command component 103 may determine whether a phoneme, phonetic sound, word, and/or words extracted/determined from the audio data match a stored phoneme, phonetic sound, word, and/or words associated with an operational command of the one or more operational commands. The command component 103 may determine whether the audio data includes a phoneme, phonetic sound, word, and/or words that correspond to and/or are otherwise associated with the one or more wake words or one or more operational commands.

The network condition component 106 may be configured to adjust the wake word confidence threshold based on network conditions. For example, the network condition component 106 may determine one or more network conditions such as network traffic, packet loss, noise, upload speeds, download speed, combinations thereof, and the like. For example, the network condition component 106 may adjust the wake word confidence threshold required to determine a wake word detect event, the beginning of the wake word, or the end of the wake word. For example, during periods when the network is experiencing high packet loss, the network condition component 106 may reduce the wake word confidence threshold so as to make it easier to generate a detect event.

The computing device 111 may comprise an audio analysis component 112, a command component 113, a storage component 114, a communications component 115, a device identifier 117, a service element 118, and an address element 119. The storage component may be configured to store audio profile data associated with one or more audio profiles associated with one or more audio sources (e.g., one or more users). For example, a first audio profile of the one or more audio profiles may be associated with a first user of the one or more users. Similarly, a second audio profile of the one or more audio profiles may be associated with a second user of the one or more users. The one or more audio profiles may comprise historical audio data such as voice signatures or other characteristics associated with the one or more users. For example, the one or more audio profiles may be determined (e.g., created, stored, recorded) during configuration or may be received (e.g., imported) from storage.

For example, the one or more audio profiles may store audio data associated with a user speaking a wake word. For example, the one or more audio profiles may comprise information like an average volume at which the user speaks the wake word, a duration or length of time the user takes to speak the wake word, a cadence at which the user speaks the wake word, a noise envelop associated with the user speaking the wake word, frequency analysis of the user speaking the wake word, combinations thereof, and the like.

The audio analysis component 112 may comprise or otherwise be in communication with the one or more microphones. The one or more microphones may be configured to receive the one or more audio inputs. The audio analysis component 112 may be configured to detect the one or more audio inputs. The one or more audio inputs may comprise audio originating from (e.g., caused by) one or more audio sources. The one or more audio sources may comprise, for example, one or more people, one or more devices, one or more machines, combinations thereof, and the like. The audio analysis component 112 may be configured to convert the analog signal to a digital signal. For example, the audio analysis component 112 may comprise an analog to digital converter.

For example, the audio analysis component 112 may determine audio originating from a user speaking in proximity to the user device 111. The one or more audio inputs may be speech that originates from and/or may be caused by a user, a device (e.g., a television, a radio, a computing device, etc.), and/or the like.

The audio analysis component 112 may be configured to determine, based on the detected audio, one or more wake words and/or portions thereof and/or one or more utterances including, for example, one or more operational commands. The one or more operational commands may be associated with the one or more utterances.

The network condition component 116 may be configured to adjust the wake word confidence threshold based on network conditions. For example, the network condition component 116 may determine one or more network conditions such as network traffic, packet loss, noise, upload speeds, download speed, combinations thereof, and the like. For example, the network condition component 116 may adjust the wake word confidence threshold required to determine a wake word detect event, the beginning of the wake word, or the end of the wake word. For example, during periods when the network is experiencing high packet loss, the network condition component 116 may reduce the wake word confidence threshold so as to make it easier to generate a detect event.

Based on determining the wake word, the computing device 111 may process the audio input. For example, processing the audio input may include, but is not limited to, opening a communication session with another device (e.g., the user device 101, a network device such as the network 120, combinations thereof, and the like). Processing the audio data may comprise determining the one or more utterances. The one or more utterances may comprise one or more operational voice commands. For example, "HBO," "tune to HBO," "preview HBO," "select HBO," and/or any other phonemes, phonetic sounds, and/or words that may be ambiguously associated with the stored operational command. Selecting between similar operational commands such as "tune to HBO," "preview HBO," "select HBO," and/or the like may be based, for example, on when the audio content is detected and historical operational commands received by the user device 101. Processing the audio input may comprise causing an action such as sending a query (e.g., "what is the weather like today?"), sending a request for content, causing a tuner to change a channel, combinations thereof, and the like.

The computing device 111 may be associated with a device identifier 117. The device identifier 117 may be any identifier, token, character, string, or the like, for differentiating one computing device (e.g., the computing device 111, etc.) from another user device. The device identifier 117 may identify computing device 111 as belonging to a particular class of user devices. The device identifier 117 may include information relating to the computing device 111 such as a manufacturer, a model or type of device, a service provider associated with the computing device 111, a state of the computing device 111, a locator, and/or a label or classifier. Other information may be represented by the device identifier 117.

The device identifier 117 may have a service element 118 and an address element 119. The service element 118 may have or provide an internet protocol address, a network address, a media access control (MAC) address, an Internet address, or the like. The address service 118 may be relied upon to establish a communication session between the computing device 111, the user device 101, or other devices and/or networks. The address element 119 may be used as an identifier or locator of the user device 101. The address element 119 may be persistent for a particular network (e.g., network 120, etc.).

The service element 118 may identify a service provider associated with the computing device 111 and/or with the class of the computing device 111. The class of the computing device 111 may be related to a type of device, a capability of a device, a type of service being provided, and/or a level of service (e.g., business class, service tier, service package, etc.). The service element 118 may have information relating to and/or provided by a communication service provider (e.g., Internet service provider) that is providing or enabling data flow such as communication services to the computing device 111. The service element 118 may have information relating to a preferred service provider for one or more particular services relating to the computing device 111. The address element 119 may be used to identify or retrieve data from the service element 118, or vice versa. One or more of the address element 119 and the service element 118 may be stored remotely from the computing device 111 and retrieved by one or more devices such as the computing device 111, the user device 101, or any other device. Other information may be represented by the service element 118.

The computing device 111 may include a communication component 115 for providing an interface to a user to interact with the user device 101. The communication component 115 may be any interface for presenting and/or receiving information to/from the user, such as user feedback. An interface may be communication interface such as a television (e.g., voice control device such as a remote, navigable menu or similar), web browser (e.g., Internet Explorer®, Mozilla Firefox®, Google Chrome®, Safari®, or the like). The communication component 115 may request or query various files from a local source and/or a remote source. The communication component 115 may transmit and/or data, such as audio content, telemetry data, network status information, and/or the like to a local or remote device such as the user device 101. For example, the user device may interact with a user via a speaker configured to sound alert tones or audio messages. The user device may be configured to displays a microphone icon when it is determined that a user is speaking. The user device may be configured to display or otherwise output one or more error messages or other feedback based on what the user has said.

FIG. 2 shows a diagram 200. The diagram shows an audio analysis window 210 (e.g., detector window). The audio analysis window 210 may a sliding period of time during which a determination is made as to whether or not a wake word has been spoken by a user. The detector window 210 is a length of time and/or a number of audio frames. The length of time may be determined temporally, or based on a number of audio frames analyzed during the audio analysis window. The audio analysis window 210 may be determined based on a wake word duration. The audio analysis window 210 may be long enough to accommodate the wake word. For example, if the wake word duration is 0.5 seconds, the audio analysis window may be at least greater than 0.5 seconds, to ensure the wake word can be completely captured in the detector window. The audio analysis window 210 may be configured to accommodate an amount of data (e.g., a number of audio frames, each audio frame comprising an amount of data).

Figure 3A:
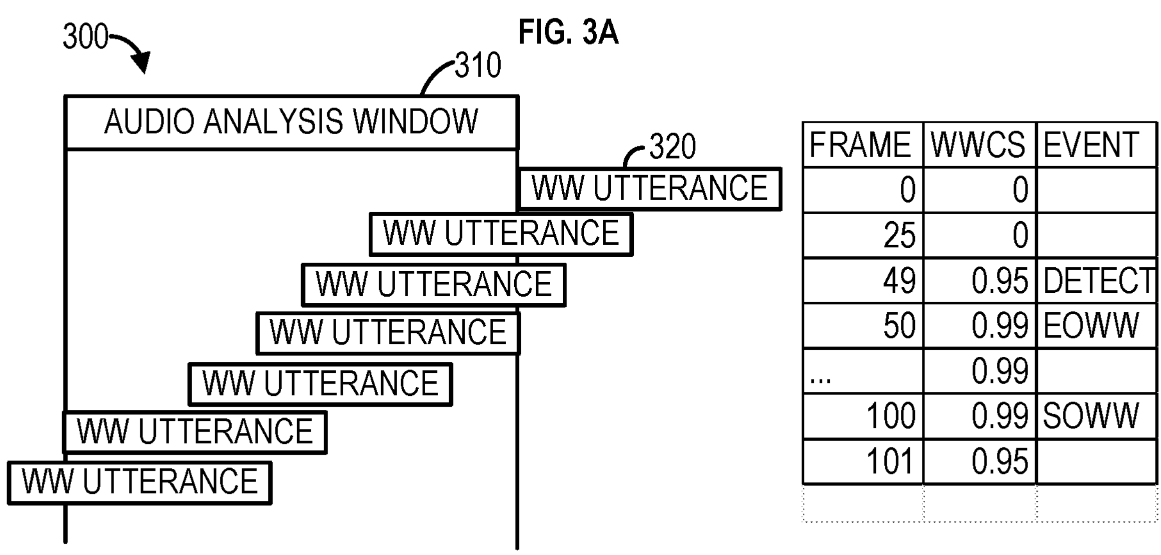
FIG. 3A shows an example diagram.

FIG. 3A shows an example audio analysis method 300. In frame 0, the wake word utterance 320 has yet to be received so it doesn't yet appear in the audio analysis window 310. The wake word confidence score (WWCS in the figure) is therefore 0. As the wake word utterance 320 is spoken (e.g., detected, received, stored) more and more of the wake word utterance 320 falls within the detector window. At frame 49, nearly the entire wake word utterance 320 falls in the audio analysis window 310, at which point a wake word confidence score of 0.95 (for example) may be determined. It may be determined that the wake word confidence score of 0.95 satisfies the wake word confidence score threshold. For example, if the wake word confidence score threshold is satisfied, a detect event may be determined (e.g., the wake word has been detected). In the subsequent $50^{th}$ frame, the entire wake word utterance 320 falls within the audio analysis window 310 and thus the wake word confidence score may be updated to 0.99. As more frames pass the wake word utterance 320 moves through the audio analysis window 310 and maintains the 0.99 wake word confidence score. Therefore, it can be determined that frame 50 is associated with the arrival of the end of the wake word utterance 320 (EOWW in the figure) in the audio analysis window because the wake word confidence score has not increased (e.g., it has reached a maximum). In other words, a maximum confidence level is reached because the entire wake word utterance falls within the detector window and thus a maximum amount of the audio analyzed (e.g., a highest percentage) is comprised of the wake word. The maximum confidence may be maintained while the wake word is in the analysis window.

At frame 101, the beginning of the wake word utterance 320 is no longer within the audio analysis window 310. Thus, the wake word confidence score may decrease to 0.95. For example, an audio frame containing the beginning of the detected wake word may be removed from storage (e.g., a cache, a buffer) as a new audio frame is added. The decrease in the wake word confidence score may indicate that a portion of the wake word has passed out of the audio analysis window 310. For example, in FIG. 3A, the start or initial portions of the wake word are no longer within the audio analysis window 310 and thus, at frame 101 (e.g., between frames 100 and 101) the confidence score decreases. The point in time and/or frame number associated with the point in time at which the wake word confidence score decreases can therefore be associated with the beginning of the wake word (e.g., start of wake word or SOWW in the figure). For example, the frame immediately before the decrease in confidence may be associated with the start of the wake word. The wake word analysis window can be continually analyzed (e.g., monitored) on continuous audio. Sliding the audio analysis window can be accomplished by removing leading portions of audio (e.g., leading audio frames) and adding subsequent portions of audio for analysis (e.g., adding audio frames) to an analysis window, an analysis group of audio frames and/or from storage such as a cache or buffer.

To determine the wake word confidence score, one or more audio frames may be determined. The one or more audio frames may be, for example, 20 milliseconds in duration. One or more Mel-Frequency Cepstral Coefficients (MFCCs) may be determined based on audio data associated with the one or more audio frames. The one or more MFCCs may represent a spectral envelope (e.g., a noise envelope or audio envelope) of a sound (e.g., the shape of the sound's frequency content). To determine the one or more MFCCs, one or more power spectrums of a sound signal may be converted to the Mel-frequency scale. A logarithm of a magnitude may be determined and a discrete cosine transform (DCT) may be performed. For example, for each audio frame (20 msec, for example) the one or more MFCCs (and optionally delta MFCCs and delta-delta MFCCs) may be determined (e.g., extracted). The delta MFCCs are the first time derivative of the MFCCs. The delta-deltas are the second time derivatives. For example, 16 MFCCs per frame, 16 delta MFCCs per frame, and 16 delta-delta MFCCs per frame may be determined.

For example, a history (e.g., a circular buffer) of MFCCs and delta MFCCs may be maintained. The history may have a buffer depth whose length corresponds to the audio analysis window size (e.g., 0.5 seconds). Thus at a frame size of 20 msec, the history depth is 25 (0.5/0.02) frames. For each frame, a three dimensional array of history [25] [2] [16] (25 frames, 2 to cover both MFCCs and delta MFCCs, and 16 to cover the number of MFCCs (and delta MFCCs) per frame) may be determined. This 3-D feature array may be input to a machine learning inference engine, whose output is the confidence score. Machine learning inference engines may be employed that have been trained to recognize a finite set of words or phrases. The output of the machine learning inference engine might be a set of confidence scores where each score is loosely associated with the probability that a particular word or phrase was spoken. The NLU may therefore receive a sequence of transcribed words where each word's score had the maximum score at a given point in time. For example, the NLU may receive words associated with the N highest scores at each point in time. This allows the NLU to make a soft per-word decision to feed a more accurate hard decision on the user intent.

Figure 3B:
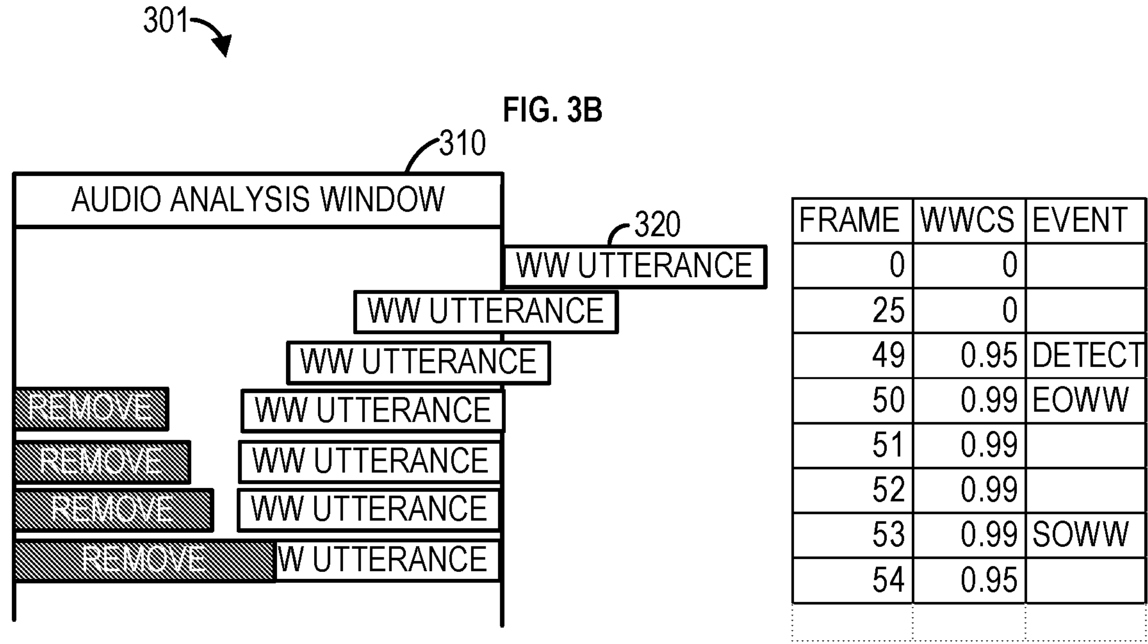
FIG. 3B shows an example diagram.

FIG. 3B shows an example audio analysis method 301. In the method 301, a linear search may be implemented. The linear search may be configured to search for the beginning of the wake word by successively removing one leading portion of audio from the audio analysis window until portions of the wake word are removed. The beginning of the wake word can be determined based on a decrease in the wake word confidence score (e.g., by removing a portion of the wake word, ostensibly the first audio frame containing a part of the wake word, we reduce the likelihood that the audio analysis window contains the wake word) that results from removing a portion of the wake word from the audio analysis. The search need not be linear. In one example, a binary search can be performed thereby reducing the number of iterations needed to determine the start of wake word compared to the linear search by the logarithm of base 2. Rather than removing individual frames linearly, the binary search method starts by removing a large number of frames of leading audio, thus guaranteeing that a minimum duration wake word is truncated, and the score is below a threshold. Then the search successively restores and/or removes the leading audio of half the number of frames from the previous iteration. Checking the score after each iteration determines whether leading audio is removed or restored: if the score is above a threshold, another portion of leading audio is removed; if the score is below a threshold, another portion is restored. Eventually, the search arrives at the wake word start timestamp. For example, four simultaneous instances of the wake word detector could be used. With each successive iteration the remaining section of audio may be divided into four equal sections for the purpose of wake word detection, the analysis run, one or more audio frames, removed, and the process repeated. The method may start with audio input features rather than raw audio. The present systems may operate on a set of Mel-Frequency Cepstrum Coefficients (MFCCs) as the input features. For example, the audio analysis component 102 may divide the audio signal into frames (20 msec, for example) and compute the MFCCs (Mel Frequency Cepstral Coefficients) for each frame. The MFCCs may be used as feature inputs to a wake word detector or automatic speech recognizer. The audio analysis component 102 may extract features such as MFCCs, phonemes, and the like that can be used by a voice recognition algorithm. Regardless of the exact nature of the features, feature extraction may be performed one or more times per frame. Starting with a window of past frames of features rather than a window of past raw audio samples, removing a frame of features may comprise one or more of zeroing out the features (e.g., indicating silence) or replacing the frames features with features indicative of background noise or static.

Figure 4:
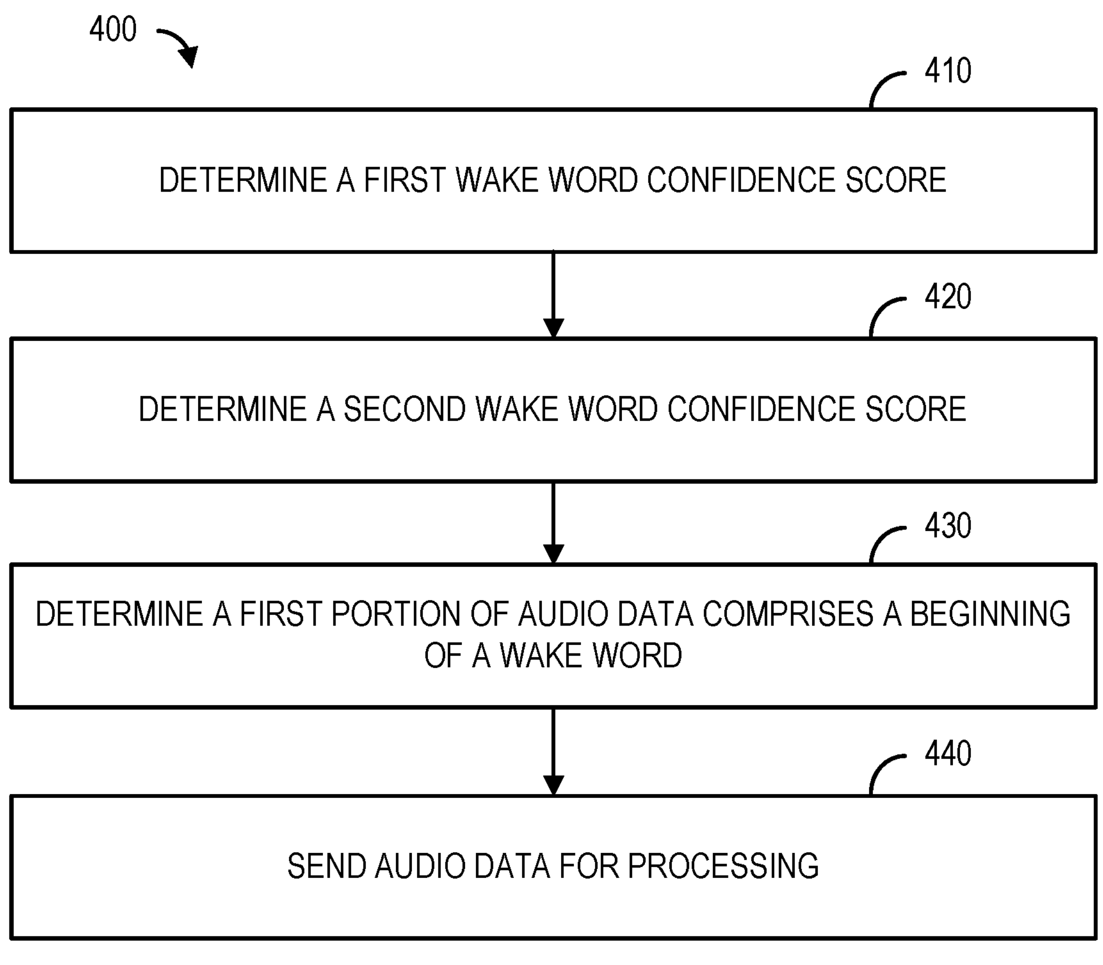
FIG. 4 shows an example method.

FIG. 4 is a flowchart of an example method 400. The method may be carried out via any one or more devices described herein. At 410 a first wake word confidence score may be determined. For example, a user device (e.g., a voice-enabled device), or computing device (e.g., "the cloud," or a server) may determine the first wake confidence score. The first wake word confidence score may be determined based on a first portion of audio data and a second portion of audio data. The first portion of audio data and the second portion of audio data may comprise one or more user utterances received by a voice enabled device. The first wake word confidence score may be associated with a first audio analysis window. The first audio analysis window may be a first period of time (e.g., a first length of time) and may comprise one or more portions of audio data. The first wake word confidence score associated with the first audio analysis window may be determined based on the one or more portions of audio data. The one or more portions of audio data may comprise one or more user utterances. The one or more portions of audio data may be the result of converting an analog input (e.g., one or more sound waves, one or more voice inputs) to a digital format. The first wake word confidence score may indicate a likelihood that the first audio analysis window contains a wake word.

At 420, a second wake word confidence score may be determined. The second wake word confidence score may be determined based on the second portion of audio data. The first wake word confidence score and the second wake word confidence score may be configured to indicate whether the first portion of audio data or the second portion of audio data comprises a portion of the wake word.

The second wake word confidence score may be associated with a second audio analysis window. For example, the user device or the computing device may determine the second audio analysis window and the second wake word confidence score. The second audio analysis window and the second wake word confidence score may be determined based on removing the first portion of audio data from a first analysis window (e.g., discounting the audio frame, marking it as containing no audio, and/or removing the first portion of audio from storage). For example, the second audio analysis window may comprise a period of time (e.g., a length of time) that is less than the first audio analysis window. For the example, the second audio analysis window may comprise fewer portions of audio data than the first audio analysis window. For example, if the first audio analysis window is two seconds, and the one or more portions of audio data are each 0.1 second long, the first audio analysis window may comprise 20 portions of audio data. For example, removing the first portion of audio data may result in the second audio analysis window comprising 19 portions of audio data and having a length of 1.9 seconds. This step may be repeated until the wake word confidence score satisfies a threshold.

At 430, it may be determined that the first portion of audio data comprises a beginning of the wake word. For example, it may be determined that the first portion of audio data comprises the beginning of the wake word based on the second wake word confidence score being less than the first wake word confidence score.

At 440, the first portion of the audio data and the second portion of audio data may be sent for processing. Sending the first portion of audio data and the second portion of audio data for processing may comprise sending the first portion of audio data and the second portion of audio data to a cloud based voice service.

The method may comprise opening a communication channel with a voice service based on the second wake word confidence score being less than the first wake word confidence score. The method may comprise determining, based on second wake word confidence score being less than the first wake word confidence score, that the second portion of audio data comprises an end of the wake word. The method may comprise determining a wake word duration.

The method may comprise determining the first portion of audio data of the one or more portions of audio data are to be removed from the first audio analysis window. For example, the user device or the computing device may remove the first portion of audio data from the first audio analysis window. Removing the first portion of audio data from the first audio analysis window may comprise indicating that the first portion of audio data comprises no audio data (e.g., the portion of audio data is silence or indecipherable audio data and therefore should not be included for analysis). The first portion of audio data may be associated with a time stamp. The time stamp may be arbitrary timing information (e.g., 0, 1, 2, etc.) or the time stamp may be a clock time. This step may be repeated until the wake word confidence satisfies a threshold.

The method may comprise determining that a time stamp indicates a beginning of the wake word. For example, the user device or the computing device may determine the time stamp indicates the beginning of the wake word. Determining the time stamp indicates the beginning of the wake word may be based on a difference between the first wake word confidence score and the second wake word confidence score. For example, the second wake word confidence score may be lower than the first wake word confidence score. For example, it may be determined that by removing the first portion of audio data, a portion (e.g., a leading portion) of the wake word was removed from audio analysis window, and therefore, the likelihood that the audio analysis window contains the complete wake word was lowered.

The method may comprise receiving one or more portions of audio. The method may comprise processing the one or more portions of audio. Processing the one or more portions of audio may comprise causing an action such as sending a query (e.g., "what is the weather like today?"), sending a request for content, causing a tuner to change a channel, combinations thereof, and the like. Processing the one or more portions of audio data may comprise determining one or more wake words, one or more user utterances, one or more operations commands, natural language processing, sending one or more queries, combinations thereof, and the like. For example, the one or more user utterances may comprise one or more operational voice commands. For example, "HBO," "tune to HBO," "preview HBO," "select HBO," and/or any other phonemes, phonetic sounds, and/or words that may be ambiguously associated with the stored operational command. Selecting between similar operational commands such as "tune to HBO," "preview HBO," "select HBO," and/or the like may be based, for example, on when the audio content is detected and historical operational commands received by the user device. For example, processing the one or more portions of audio may include, but is not limited to, opening a communication session with another device or devices and/or the cloud.

The method may comprise receiving, from a voice enabled device, one or more portions of audio data. The method may comprise determining, based on the voice enabled device, a wake word and a wake word duration. The method may comprise determining, based on the wake word duration, a first audio analysis window, wherein the first audio analysis window comprises the one or more portions of audio data.

The method may comprise sending the one or more portions of audio data. The method may comprise sending one or more instructions. For example, the user device may send the one or more instructions to the computing device. The one or more instructions may comprise timing data. The one or more instructions may be configured to cause the computing device to process the one or more portions of audio data or not process the one or more portions of audio data based on the timing data.

Figure 5:
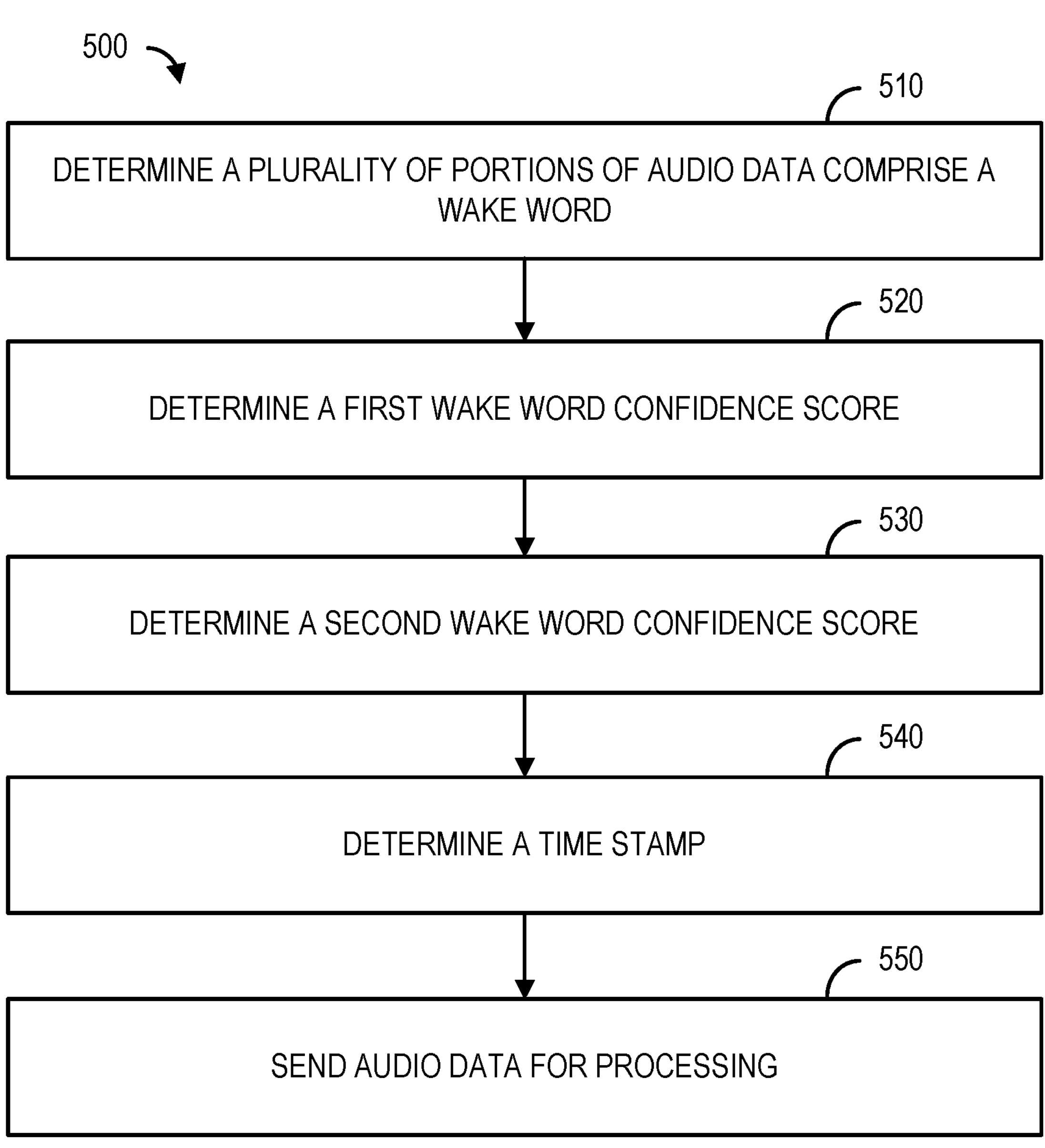
FIG. 5 shows an example method.

FIG. 5 is a flowchart of an example method 500. The method may be carried out on any one or more devices as described herein. At 510, it may be determined that a plurality of portions of audio data comprises a wake word. The wake word may be a user utterance configured to "wake up" (e.g., activate) a voice enabled device. For example, the wake work may be "Hey Siri," or "Alexa" or "Hello Sky." The wake word may be configured to cause the user device (e.g., the voice enable device) to process one or more portions of audio. Processing the one or more portions of audio may comprise performing NLP or NLU on the one or more portions of audio, opening one or more communication channels, sending one or more queries, executing one or more commands, combinations thereof, and the like. Determining the wake word and the wake word duration may be based on receiving one or more portions of audio data. The one or more portions of audio data may be analog data (e.g., sound waves, voice inputs, etc.) or digital data (e.g., the result of converting the analog data to digital data).

At 520, a first wake word confidence score may be determined. For example, the first wake word confidence score may be determined based on a first portion of audio data and second portion of audio data. For example, the first wake word confidence score may be determined by the user device or the computing device. The first wake word confidence score may indicate a likelihood that a first audio analysis window contains a wake word. The first wake word confidence score may be determined based on one or more portions of audio data. The one or more portions of audio data may comprise one or more user utterances. The one or more portions of audio data may be the result of converting an analog input (e.g., one or more sound waves, one or more voice inputs) to a digital format.

At 530, a second wake word confidence score may be determined. For example, the second wake word confidence score may be determined based on a second portion of audio data and third portion of audio data. For example, the second wake word confidence score may be determined by the user device or the computing device. The second wake word confidence score may indicate a likelihood that the audio analysis window contains a wake word. The second wake word confidence score may be determined based on one or more portions of audio data. The one or more portions of audio data may comprise one or more user utterances. The one or more portions of audio data may be the result of converting an analog input (e.g., one or more sound waves, one or more voice inputs) to a digital format.

At 540, it may be determined that a time stamp associated with the second portion of audio data corresponds to a beginning of the wake word. for example, it may be determined that the time stamp associated with the second portion of the audio data corresponds to the beginning of the wake word based on the second wake word confidence score being higher than the first wake word confidence score.

At 550, the second portion of the audio data and one or more subsequent portions of audio data may be sent for processing. For example, the second portion of the audio data and the one or more subsequent portions of audio data may be sent for processing based on determining the time stamp associated with the second portion of the audio corresponding to the beginning of the wake word. Processing the plurality of portions of audio data may one or more of: responding to a query, sending a message, or executing a command.

The method may comprise determining a wake word duration. For example, the wake word duration may be determined by the user device or the computing device. The wake word duration may be associated with the wake word. The wake word duration may be a length of time associated with the wake word. For example, the wake word duration may comprise an expected amount of time for a user to speak the wake word.

The method may comprise determining an audio analysis window. For example, the user device or the computing the device may determine the analysis window. The analysis window may be determined based on the wake word duration. The analysis window may comprise the one or more portions of audio data. An analysis window duration associated with the analysis window may be determined. The analysis window duration may be a length time (determined based on the passage of time or a sum of smaller units of time associated with the one or more portions of audio data). The analysis window duration may comprise a beginning time stamp and an ending time stamp.

The method may comprise updating a beginning time stamp and an ending time stamp associated with the wake word. For example, the user device or the computing device may update the beginning time stamp and/or the ending time stamp. The beginning time stamp and/or the ending time stamp may be updated based on one or more subsequent portions of audio data. For example, the one or more subsequent portions of audio data may be received, processed, or generated after the one or more portions of audio data. Updating the beginning time stamp and the ending time stamp may comprise indicating the one or more portions of audio data comprise no audio data (e.g., they should be regarded as silent, or null, or comprising indecipherable audio data such as static or interference, or simply comprising audio that does not contribute to a higher wake word detector confidence score. Updating the beginning time stamp and the ending time stamp may comprise adjusting or manipulating timing data associated with the beginning time stamp. The timing data may be a frame number, an arbitrary time unit (e.g., 0, 1, 2, etc), or a clock timer. Updating the beginning time stamp or ending time stamp may comprise adding, to the analysis window, one or more subsequent portions of audio data and/or removing, from the analysis window, the one or more portions of audio data such that the analysis window duration does not change.

The method may comprise processing the one or more portions of audio data. Processing the one or more portions of audio may comprise causing an action such as sending a query (e.g., "what is the weather like today?"), sending a request for content, causing a tuner to change a channel, combinations thereof, and the like. Processing the one or more portions of audio data may comprise determining one or more wake words, one or more user utterances, one or more operations commands, natural language processing, sending one or more queries, combinations thereof, and the like. For example, the one or more user utterances may comprise one or more operational voice commands. For example, "HBO," "tune to HBO," "preview HBO," "select HBO," and/or any other phonemes, phonetic sounds, and/or words that may be ambiguously associated with the stored operational command. Selecting between similar operational commands such as "tune to HBO," "preview HBO," "select HBO," and/or the like may be based, for example, on when the audio content is detected and historical operational commands received by the user device. For example, processing the one or more portions of audio may include, but is not limited to, opening a communication session with another device or devices and/or the cloud. The method may comprise causing, based on determining that the updated time stamp corresponds to the beginning of the wake word, processing of the one or more portions of audio data.

Figure 6:
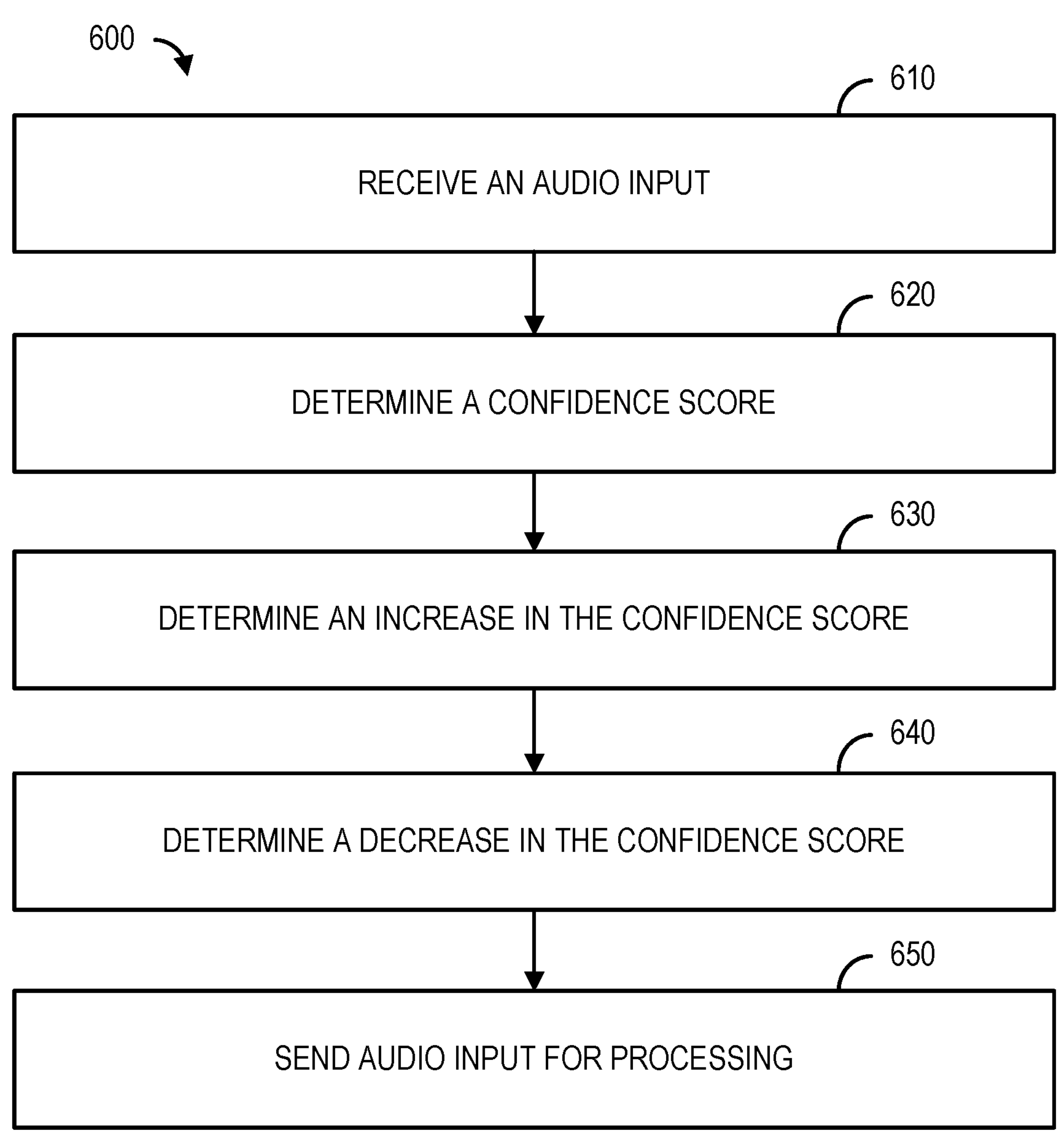
FIG. 6 shows an example method.

FIG. 6 is a flowchart of an example method 600 for voice control. The method may be carried out on any one or more devices as described herein. At 610, an audio input may be received. The audio input may be received by a user device (e.g., a voice enabled device) or a computing device (e.g., a server). The audio input may comprise a wake word, one or more user utterances, combinations thereof, and the like. The audio input may comprise one or more audio frames.

At 620, a confidence score that each audio frame of the plurality of audio frames comprises a portion of a wake word may be determined. For example, it may be determined that a portion of the audio input comprises the portion of the wake word. For example, the user device or the computing device may determine the portion of the audio input comprises the portion of the wake word. The determination that the portion of the audio input comprises the portion of the wake word may be made based on a confidence score associated with the portion of the audio input. The confidence score associated with the portion of the audio input may comprise an indication of a likelihood that the portion of the audio input comprises the portion of the wake word. The portion of the audio input may be received within a detection window. The detection window may comprise a size of memory or length of memory configured to store, permanently or temporarily, a preconfigured number of audio frames. The confidence score may satisfy a threshold.

At 630, an increase in the confidence score may be determined. The increase in the confidence score may be determined between a first two audio frames. For example, a first confidence score may be associated with a first audio frame and a second confidence score may be associated with a second audio frame. The second confidence score may be greater than then first confidence score. A decrease in the confidence score may be determined. The decrease in the confidence score may be determined between a second two audio frames. For example, a third confidence score may be associated with a third audio frame and a fourth confidence score may be associated with a fourth audio frame. The fourth confidence score may be less than then third confidence score.

At 640, a first boundary of the wake word may be determined based on the increase in the confidence score between the first two audio frames. A second boundary of the wake word may be determined based on a decrease in the confidence score between the second two audio frames. For example, it may be determined that the first two audio frames within a detection window are associated with a start of the wake word. For example, the user device or the computing device may determine that the first two audio frame of the one or more audio frames is associated with the start of the wake word and the second two audio frames is associated with the end of the wake word.

At 650, the audio input may be processed. The audio input may be processed based on the first boundary of the wake word and the second boundary of the wake word. Processing the audio input may comprise sending the audio input to a cloud based voice service.

The method may comprise receiving, based on the one or more user utterances, from a cloud based voice service, one or more responses. The method may comprise determining, based on the first boundary and the second boundary, a wake word duration.

The method may comprise determining a duration of the wake word. For example, the user device or the computing device may determine the duration of the wake word. The determination of the duration of the wake word may be determined based on timing data associated with the one or more audio frames. Determining the duration of the wake word may comprise determining the duration of the wake word based on an audio analysis window, the time associated with the first audio frame, and the time associated with the second audio frame.

The method may comprise determining the time associated with the first audio frame and the time associated with the second audio frame. The method may comprise processing one or more portions of audio data. Processing the one or more portions of audio may comprise causing an action such as sending a query (e.g., "what is the weather like today?"), sending a request for content, causing a tuner to change a channel, combinations thereof, and the like. Processing the one or more portions of audio data may comprise determining one or more wake words, one or more user utterances, one or more operations commands, natural language processing, sending one or more queries, combinations thereof, and the like. For example, the one or more user utterances may comprise one or more operational voice commands. For example, "HBO," "tune to HBO," "preview HBO," "select HBO," and/or any other phonemes, phonetic sounds, and/or words that may be ambiguously associated with the stored operational command. Selecting between similar operational commands such as "tune to HBO," "preview HBO," "select HBO," and/or the like may be based, for example, on when the audio content is detected and historical operational commands received by the user device. For example, processing the one or more portions of audio may include, but is not limited to, opening a communication session with another device or devices and/or the cloud. The method may comprise causing, based on determining that the updated time stamp corresponds to the beginning of the wake word, processing of the one or more portions of audio data.

Figure 7:
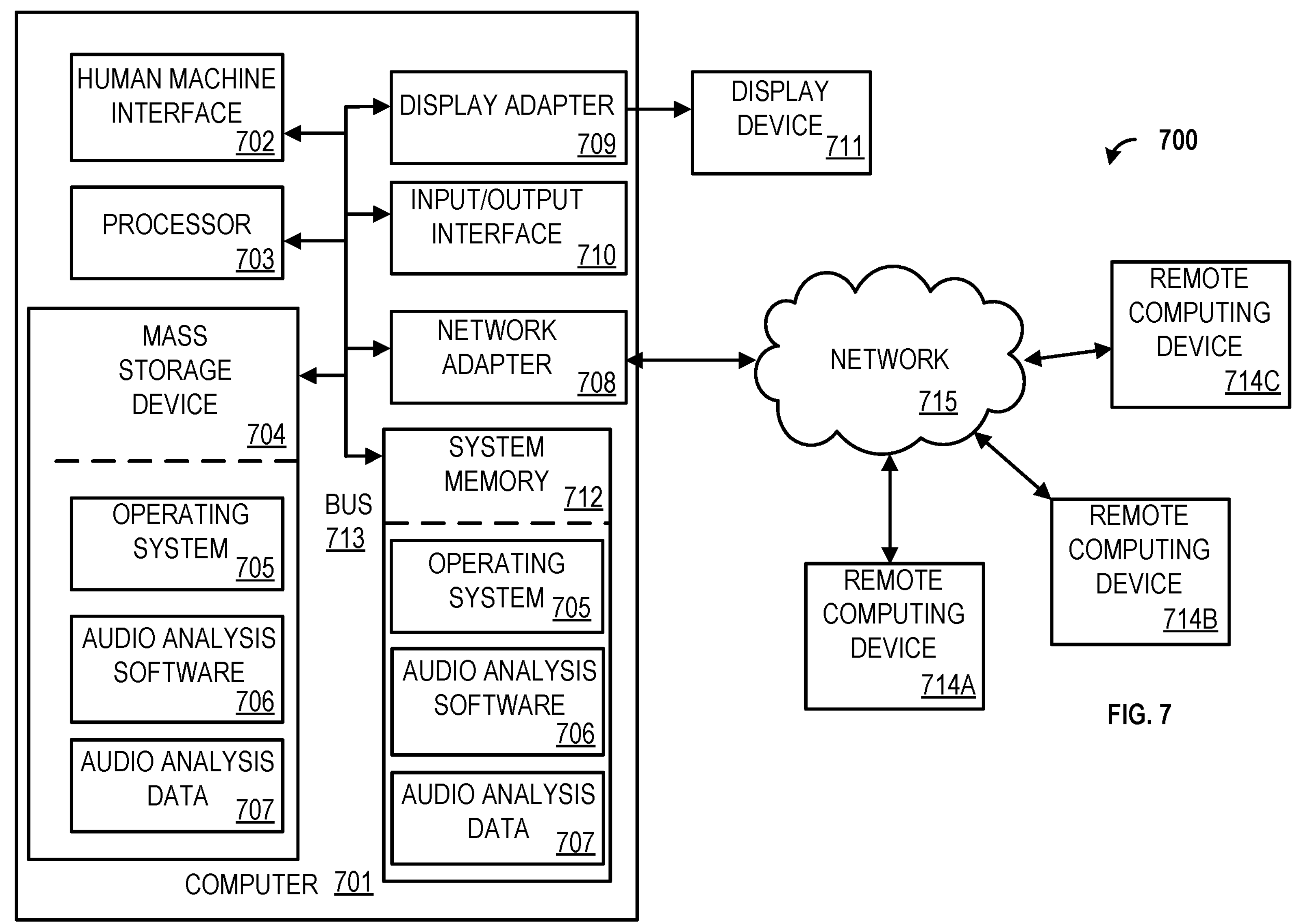
FIG. 7 shows an example system.

FIG. 7 shows a system 700 for voice control. Any device and/or component described herein may be a computer 701 as shown in FIG. 7.

The computer 701 may comprise one or more processors 703, a system memory 712, and a bus 713 that couples various components of the computer 701 including the one or more processors 703 to the system memory 712. In the case of multiple processors 703, the computer 701 may utilize parallel computing.

The bus 713 may comprise one or more of several possible types of bus structures, such as a memory bus, memory controller, a peripheral bus, an accelerated graphics port, and a processor or local bus using any of a variety of bus architectures.

The computer 701 may operate on and/or comprise a variety of computer-readable media (e.g., non-transitory). Computer-readable media may be any available media that is accessible by the computer 701 and comprises, non-transitory, volatile, and/or non-volatile media, removable and non-removable media. The system memory 712 has computer-readable media in the form of volatile memory, such as random access memory (RAM), and/or non-volatile memory, such as read-only memory (ROM). The system memory 712 may store data such as utterance data 707 and/or program components such as operating system 705 and utterance software 706 that are accessible to and/or are operated on by the one or more processors 703.

The computer 701 may also comprise other removable/non-removable, volatile/non-volatile computer storage media. The mass storage device 704 may provide non-volatile storage of computer code, computer-readable instructions, data structures, program components, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program components may be stored on the mass storage device 704. An operating system 705 and utterance software 706 may be stored on the mass storage device 704. One or more of the operating system 705 and utterance software 706 (or some combination thereof) may comprise program components and the utterance software 706. Utterance data 707 may also be stored on the mass storage device 704. Utterance data 707 may be stored in any of one or more databases known in the art. The databases may be centralized or distributed across multiple locations within the network 715.

A user may enter commands and information into the computer 701 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human-machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

A display device 711 may also be connected to the bus 713 via an interface, such as a display adapter 709. It is contemplated that the computer 701 may have more than one display adapter 709 and the computer 701 may have more than one display device 711. A display device 711 may be a monitor, an LCD (Liquid Crystal Display), a light-emitting diode (LED) display, a television, a smart lens, smart glass, and/or a projector. In addition to the display device 711, other output peripheral devices may comprise components such as speakers (not shown) and a printer (not shown) which may be connected to the computer 701 via Input/Output Interface 710. Any step and/or result of the methods may be output (or caused to be output) in any form to an output device. Such output may be any form of visual representation, including, but not limited to, textual, graphical, animation, audio, tactile, and the like. The display 711 and computer 701 may be part of one device, or separate devices.

The computer 701 may operate in a networked environment using logical connections to one or more remote computing devices 714A,B,C. A remote computing device 714A,B,C may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network nodes, and so on. Logical connections between the computer 701 and a remote computing device 714A,B,C may be made via a network 715, such as a local area network (LAN) and/or a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components may reside at various times in different storage components of the computing device 701, and are executed by the one or more processors 703 of the computer 701. An implementation of utterance software 706 may be stored on or sent across some form of computer-readable media. Any of the disclosed methods may be performed by processor-executable instructions embodied on computer-readable media.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:

receiving, a first portion of audio data and a second portion of audio data;

determining, based on the first portion of audio data and the second portion of audio data, a first wake word confidence score;

determining, based on the second portion of audio data, a second wake word confidence score;

determining, based on the second wake word confidence score being less than the first wake word confidence score, that the first portion of audio data comprises a beginning of a wake word; and based on the first portion of audio data comprising the beginning of the wake word, sending the first portion of audio data for processing and excluding the second portion of audio data.

2. The method of claim 1, wherein the first portion of audio data and the second portion of audio data comprise one or more user utterances received by a voice enabled device.

3. The method of claim 1, wherein the first wake word confidence score and the second wake word confidence score are configured to indicate the first portion of audio data or the second portion of audio data comprises a portion of the wake word.

4. The method of claim 1, further comprising opening a communication channel with a voice service based on the second wake word confidence score being less than the first wake word confidence score.

5. The method of claim 1, wherein sending the first portion of audio data and the second portion of audio data for processing comprises sending the first portion of audio data and the second portion of audio data to a cloud based voice service.

6. The method of claim 1, further comprising determining, based on the second wake word confidence score being less than the first wake word confidence score, that the second portion of audio data comprises an end of the wake word.

7. The method of claim 1, further comprising determining a wake word duration.

8. A method comprising:

receiving a plurality of portions of audio data comprising a wake word;

determining, based on a first portion of audio data of the plurality of portions of audio data and a second portion of audio data of the plurality of portions of audio data, a first wake word confidence score;

determining, based on the second portion of audio data and a third portion of audio data of the plurality of portions of audio data, a second wake word confidence score;

determining, based on the second wake word confidence score being higher than the first wake word confidence score, that a time stamp associated with the second portion of audio data corresponds to a beginning of the wake word; and based on determining the time stamp associated with the second portion of audio data corresponds to the beginning of the wake word, opening a communication channel with a service.

9. The method of claim 8, wherein the plurality of portions of audio data comprise one or more voice inputs received from a voice enabled device.

10. The method of claim 8, wherein the first wake word confidence score indicates a likelihood the first portion of audio data or the second portion of audio data comprise a wake word.

11. The method of claim 8, wherein determining that the time stamp associated with the second portion of audio data corresponds to the beginning of the wake word comprises determining an audio analysis window.

12. The method of claim 8, further comprising processing the plurality of portions of audio data, wherein processing the plurality of portions of audio data comprises one or more of: responding to a query, sending a message, or executing a command.

13. The method of claim 8, further comprising determining, based on the time stamp, a wake word duration.

14. The method of claim 8, further comprising receiving, from a voice service, one or more responses.

15. A method comprising:

receiving an audio input comprising a plurality of audio frames;

determining, for each audio frame of the plurality of audio frames, a confidence score that an audio frame of the plurality of audio frames comprises a portion of a wake word;

determining an increase in the confidence score between a first two audio frames of the plurality of audio frames and a decrease in the confidence score between a second two audio frames of the plurality of audio frames;

determining, based on the increase in the confidence score, a first boundary of the wake word, and, based on the decrease in the confidence score, a second boundary of the wake word; and sending only the audio input between the first boundary and the second boundary to a service.

16. The method of claim 15, wherein the audio input comprises one or more user utterances received by a voice enabled device.

17. The method of claim 16, further comprising receiving, based on the one or more user utterances, from a cloud based voice service, one or more responses.

18. The method of claim 15, further comprising determining, based on the first boundary and the second boundary, a wake word duration.

19. The method of claim 15, wherein the service comprises a cloud based voice service.

20. The method of claim 19, further comprising determining timing data associated with the first two audio frames and timing data associated with the second two audio frames.

* * * * *